Oct. 31, 1950     P. L. WEIDENSCHILLING     2,527,864
HEATING DEVICE FOR CURVED-WALL CONTAINERS
Filed June 15, 1948
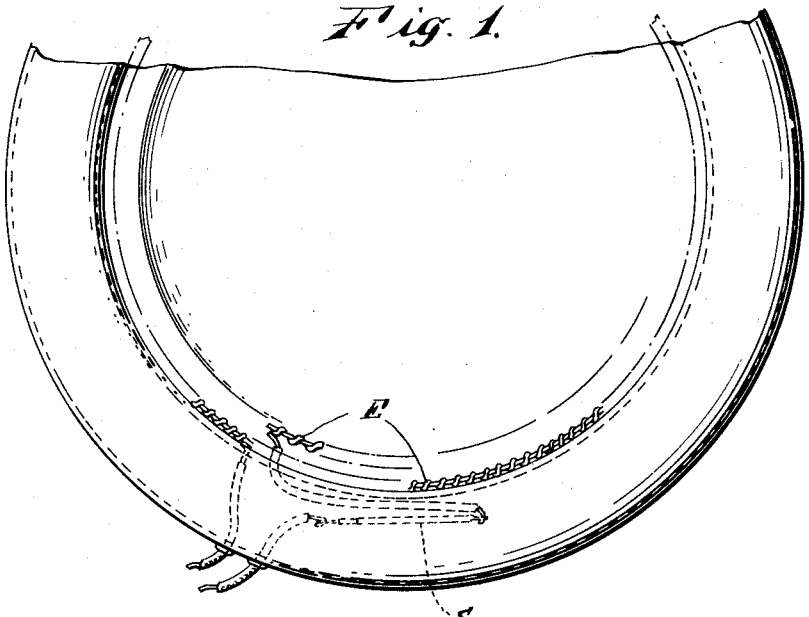
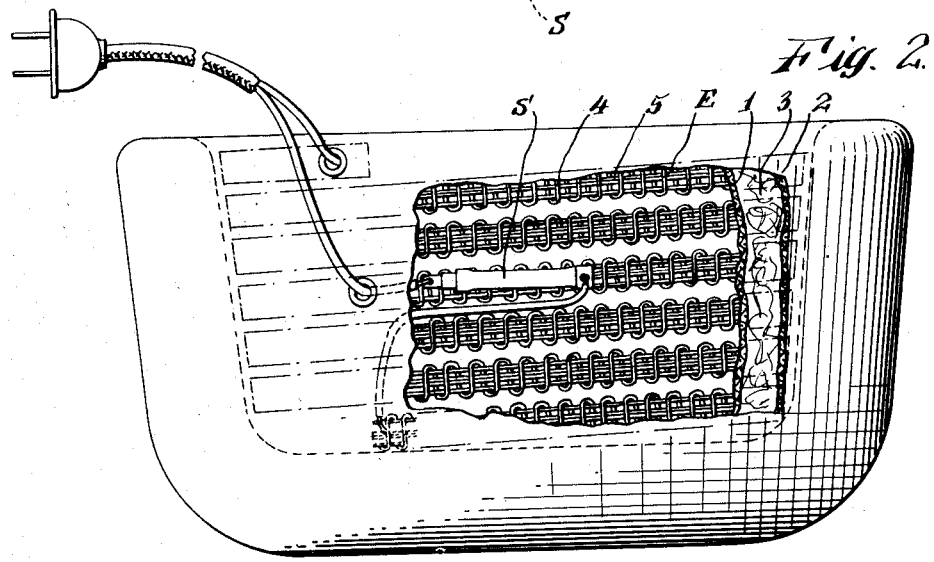
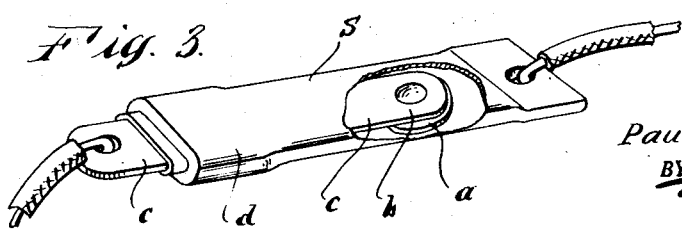
INVENTOR.
Paul Luther Weidenschilling
BY
ATTORNEY.

Patented Oct. 31, 1950

2,527,864

UNITED STATES PATENT OFFICE 2,527,864

HEATING DEVICE FOR CURVED-WALL CONTAINERS

Paul Luther Weidenschilling, Bloomfield, N. J., assignor to Gyco Instruments, Inc., Bloomfield, N. J., a corporation of New Jersey Application June 15, 1948, Serial No. 33,130

4 Claims. (Cl. 219—43)

This invention relates to heating devices for curved-wall containers, such as glass laboratory apparatus, and more particularly to heating devices which are adapted for use in the heating of spherical containers comprised of glass and forming a part or element of chemical laboratory apparatus.

The object of the invention is to provide an improved heating device for such curved-wall containers.

Another object is to provide such a heating device in which means is provided to protect the heating element thereof from premature burn-out.

A further object is to provide, in a heating device for such curved-wall containers, a means limiting the current input to the heating element of the device to a safe operating temperature.

Other objects will be apparent as the invention is more fully hereinafter disclosed.

In accordance with these objects I have discovered that the operating life of the heating element of a heating device for such curved-wall containers is primarily dependent upon the disintegration temperature of the thermal and electrical insulation immediately surrounding the heating element and that to prevent the premature burn-out of the heater element the temperature of the element must be maintained below the disintegration temperature of the surrounding thermal and electrical insulation.

Heretofore in the art a heating device for curved-wall containers, and particularly for spherical containers comprised of glass and forming a part of apparatus known in the art as chemical laboratory apparatus, has been disclosed and claimed in Morey Patent No. 2,231,506, issued February 11, 1941. The present invention is an improvement invention of said heating device.

The improvement of the present invention resides in the provision of an elongated, convoluted heating element surfaced or covered with a heat and electrical insulation which element is attached to the outer face of the flexible inner curved wall of the heating device of said patent as a spiral winding thereon, in substitution for the type of heating element described and claimed in the patent and by the provision of a thermostatic switch means electrically connected in series with the spiral heating element which is located adjacent the inner face of the said flexible inner curved wall of the heating device, in a position intermediate the top and bottom of the device, where the temperature of a mid-section of the elongated, convoluted and spirally wound heating element will directly affect the said switch means to operate the same.

The switch means is designed and arranged to operate to interrupt the electric current energizing the spirally wound heater element at a temperature substantially below the disintegrating temperature of the thermal and electrical insulation interposed between the heater element and the switch, which insulation normally comprises the insulation covering the surface of the heating element and that comprising the inner flexible wall of the heating device, the thermal conductivities of which are known constants.

As one specific example or embodiment of the invention, but not as a limitation thereof, the invention will be described as it has been adapted for use in a heating device for spherical glass containers.

Before further disclosure of the invention and this specific embodiment thereof, reference should now be made to the accompanying drawings wherein:

Fig. 1 is a broken top view of the heating device of the specific embodiment improved in accordance with the present invention;

Fig. 2 is a broken-away side view of the same; and

Fig. 3 is a perspective view of the thermostatic switch means employed therein.

In the drawings, the heating device of the specific embodiment comprises, in combination, inner and outer flexible hemispherical walls 1 and 2 with a filling of heat insulating fibrous material interposed therebetween, each said walls 1 and 2 being comprised of woven glass fabric having a thickness of about $\frac{1}{32}$ inch.

Heating element E, consisting of an elongated electrical resistance wire, convoluted into the form of a strip with a plurality of glass wool threads 5, is mounted spirally upon the outer face of inner wall 1, substantially as shown.

Thermostatic switch means S is disposed adjacent the inner surface of inner wall 1 in a position intermediate the top and bottom thereof to be directly affected by the heat energy emanating from a length of the heating element, and is electrically connected in series with the heating element E, substantially as shown.

The switch means S, per se, forms no part of the present invention except in the combination shown, and is otherwise an old and well known instrumentality. It consists essentially of a fixed contact $a$, and a movable contact $b$ mounted upon thermosensitive strip c, said contacts and strip being enclosed by a housing d. By a proper design of these elements the temperature at which the strip c operates to open contacts a and b may be precisely set.

In the instant invention, my experience has shown that the temperature of the heating element E should not exceed the softening temperature of the glass comprising the glass wool forming the basis for the woven glass cover enclosing the same, the threads 5, and the woven inner wall i. This temperature normally approximates 400° C.

With the thickness of cover and wall hereinabove indicated, I have found that switch means must be set to operate at a temperature of about 350° C. allowing for about a 50° C. drop or lag in temperature in the insulated space gap between the heating element E and the switch S. With increase and decrease in the heat insulation provided in this space gap the operating temperature of the switch S will be varied accordingly. With increase or decrease in the softening temperature of the glass wool or other insulation provided in the space gap, the operating temperature of the switch means S will be varied accordingly. The function of the switch means S in this combination is to limit the temperature of the heating element E to an operating temperature substantially below the disintegrating temperature of the insulation in contact therewith.

It is believed apparent from the above disclosure and the specific embodiment shown and described that the invention may be widely modified without essential departure therefrom and all modifications and departures therefrom are contemplated as may fall within the scope of the following claims:

What I claim is:

1. In a heating device for curved-wall containers, the combination consisting of an inner flexible wall comprised of heat and electrical insulating material and forming a pocket to receive the container for heating, a heating element consisting of a convoluted length of electrical resistance wire spirally secured to the outer face of said inner wall, the length of said heating element being covered with a heat resistant electrical insulating material, and a thermo-responsive switch means disposed adjacent the inner face of said inner wall in alignment with and in determined spaced relation to an intermediate length of said heating element, said thermoresponsive switch means having a pre-set temperature of operation substantially below the disintegration temperature of the insulation material filling the space gap between the said switch means and said intermediate length of said heating element, and means electrically connecting the said heating element and the said switch means electrically in series for connection to a source of energizing electric current.

2. In a heating device for spherical containers, the combination consisting of an inner flexible hemispherical wall comprised of heat and electrical insulation material and forming a pocket seating a spherical container for heating, a heating element secured to the outer surface of said inner wall, said element consisting of a convoluted length of an electrical resistance wire having a covering consisting of heat-resistant electrical insulation material, said length being disposed in a spiral winding on the outer surface of said flexible wall, and a thermostatic switch located adjacent the inner face of the said wall in alignment with and in determined spaced relation to an intermediate section of the convoluted length of said spirally wound heating element, said switch having a pre-set operating temperature substantially below the disintegrating temperature of the insulation material interposed between the switch and heating element, and means electrically connecting the switch and heating element in series for electrical connection to a source of energizing electric current.

3. In a heating device for spherical containers, the combination of inner and outer flexible hemispherical walls, the inner said wall being hemispherical and being comprised of heat-resistant electrical insulation material, a filling of fibrous heat insulation filling the space gap between said inner and outer walls, a heating element secured to the outer face of the inner hemispherical flexible wall, said element consisting of a convoluted length an electrical resistance wire having a cover consisting of heat-resistant electrical insulating material thereover, said length being formed into a spiral having a hemispherical shape conforming to that of the inner hemispherical wall, and a thermostatic switch disposed adjacent the inner face of said inner hemispherical wall in alignment with and in determined spaced relation to a middle length of said spiral heating element, means electrically connecting said switch means and heating element in series, said switch having a pre-set operating temperature substantially below the disintegrating temperature of the insulation interposed in the space gap between the said switch means and intermediate length of said heating element.

4. The combination of claim 3, said inner wall and said insulating cover on said heating element each consisting of fibrous glass wool of determined thickness and of known coefficient of heat conductance and said pre-set temperature being substantially below the softening temperature of the glass comprising said glass wool, thereby limiting the maximum operating temperature of said device to a temperature substantially below the softening temperature of the glass wool insulation disposed in the space gap between the said switch means and said intermediate length of said heating element.

PAUL LUTHER WEIDENSCHILLING.

REFERENCES CITED

The following references are of record in the file of this patent:

UNITED STATES PATENTS

| Number | Name | Date |
|---|---|---|
| 448,743 | O'Meara | Mar. 24, 1891 |
| 1,242,687 | Harth | Oct. 9, 1917 |
| 1,657,479 | MacFarland | Jan. 31, 1928 |
| 2,038,275 | Fogg | Apr. 21, 1936 |
| 2,157,606 | Harris | May 9, 1939 |
| 2,231,506 | Morey | Feb. 11, 1941 |
| 2,339,409 | Joy et al. | Jan. 18, 1944 |
| 2,405,103 | Winn | July 30, 1946 |